(12) United States Patent (10) Patent No.: US 12,654,359 B2
Na et al. (45) Date of Patent: Jun. 16, 2026

(54) CONTROL METHOD FOR 3D PRINTER FOR CONSTRUCTION

(71) Applicant: Samsung E&A Co., Ltd., Seoul (KR)

(72) Inventors: Ho Sung Na, Seoul (KR); Jun Taek Lim, Seoul (KR); Woon Hee Ko, Seoul (KR); Jin Sung Park, Seoul (KR); Joon Hyouk Kim, Seoul (KR); Ju In Park, Seoul (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/844,529

(22) PCT Filed: Feb. 29, 2024

(86) PCT No.: PCT/KR2024/002691
§ 371 (c)(1),
(2) Date: Sep. 6, 2024

(87) PCT Pub. No.: WO2024/186067
PCT Pub. Date: Sep. 12, 2024

(65) Prior Publication Data
US 2026/0001254 A1 Jan. 1, 2026

(30) Foreign Application Priority Data
Mar. 6, 2023 (KR) ........................ 10-2023-0029165

(51) Int. Cl.
*B28B 17/00* (2006.01)
*B28B 1/00* (2006.01)
(Continued)

(52) U.S. Cl.
CPC .......... *B28B 17/0081* (2013.01); *B28B 1/001* (2013.01); *B29C 64/393* (2017.08); *B33Y 50/02* (2014.12)

(58) Field of Classification Search
CPC ...... B29C 64/386; B29C 64/393; B33Y 50/02
See application file for complete search history.

(56) References Cited

U.S. PATENT DOCUMENTS

2015/0061170 A1* 3/2015 Engel ..................... B33Y 10/00
425/135
2018/0297114 A1 10/2018 Preston et al.
(Continued)

FOREIGN PATENT DOCUMENTS

CN 108381916 * 8/2018
CN 109989585 * 7/2019
(Continued)

OTHER PUBLICATIONS

First Office Action issued by the Chinese Patent Office in corresponding Chinese Application No. 202480002034.6 on Mar. 22, 2025 (13 pages with English Translation).
(Continued)

*Primary Examiner* — Edmund H Lee
(74) *Attorney, Agent, or Firm* — Panitch Schwarze Belisario & Nadel LLP

(57) ABSTRACT

The present disclosure relates to a method of controlling a 3D printer for construction which prints and forms various structures, in which a controller 10 configured to control the 3D printer for construction, a scanner 30 configured to detect stereographic surface information, and a computer 40 connected to the controller 10 and the scanner 30 are provided so that the scanner 30 detects actually measured surface information 39 of a printing matter 20 and transmits the detected actually measured surface information 39 to the computer 40, and the computer 40 compares the actually measured surface information 39 with planned surface information 49 to calculate a printing error and then corrects command information 19 such that the printing error is compensated for and transmits the corrected command
(Continued)

information 19 to the controller 10. Through the present disclosure, in forming a structure using the 3D printer for construction, an error of the printing matter 20 may be quickly identified in real time, and also a setting value of the controller 10 of the 3D printer for construction may be immediately adjusted based on the identified error.

1 Claim, 11 Drawing Sheets

(51) Int. Cl.
B29C 64/393 (2017.01)
B33Y 50/02 (2015.01)

(56) References Cited

U.S. PATENT DOCUMENTS

| | | | |
|---|---|---|---|
| 2019/0054700 A1 * | 2/2019 | Chandar | G06F 17/18 |
| 2020/0048893 A1 | 2/2020 | Martinez et al. | |
| 2021/0096537 A1 | 4/2021 | Mantell et al. | |
| 2021/0146631 A1 * | 5/2021 | Li | E04B 1/16 |
| 2021/0370609 A1 | 12/2021 | Nikshi et al. | |
| 2023/0008260 A1 | 1/2023 | Marks et al. | |
| 2023/0390958 A1 | 12/2023 | Na et al. | |

FOREIGN PATENT DOCUMENTS

| | | | |
|---|---|---|---|
| CN | 110281346 | * | 9/2019 |
| CN | 112589098 A | | 4/2021 |
| CN | 113993672 | * | 1/2022 |
| CN | 114022530 A | | 2/2022 |
| CN | 115256950 | * | 2/2023 |
| DE | 102012022435 | * | 5/2014 |
| JP | 2015217682 A | | 12/2015 |
| KR | 20160078093 A | | 7/2016 |
| KR | 20200057840 A | | 5/2020 |
| KR | 102137247 B1 | | 7/2020 |
| KR | 2020-0101482 | * | 8/2020 |
| KR | 20200101482 A | | 8/2020 |
| KR | 20210039291 A | | 4/2021 |
| KR | 102396629 A | | 5/2022 |
| WO | 2017139332 A1 | | 8/2017 |
| WO | 2023025893 A1 | | 3/2023 |

OTHER PUBLICATIONS

International Search Report, issued on Jun. 12, 2024, in International Application No. PCT/KR2024/002691, 12 pages (including English-language translation).
Extended European Search Report dated Aug. 12, 2025, in the corresponding European Patent Application No. 24767356.9 (20 Pages).

\* cited by examiner

CONTROL METHOD FOR 3D PRINTER FOR CONSTRUCTION

TECHNICAL FIELD

The present disclosure relates to a method of controlling a three-dimensional (3D) printer for construction which prints and forms various structures, in which a controller 10 configured to control the 3D printer for construction, a scanner 30 configured to detect stereographic surface information, and a computer 40 connected to the controller 10 and the scanner 30 are provided so that the scanner 30 detects actually measured surface information 39 of a printing matter 20 and transmits the detected actually measured surface information 39 to the computer 40, and the computer 40 compares the actually measured surface information 39 with planned surface information 49 to calculate a printing error and then corrects command information 19 such that the printing error is compensated for and transmits the corrected command information 19 to the controller 10.

BACKGROUND ART

Three-dimensional (3D) printers for construction are devices that complete a structure of a desired shape by linearly extruding and stacking fluid materials to which a material such as concrete or mortar is applied. The 3D printers for construction may have significant advantages in allowing the omission or minimization of a form construction process, which is a process essentially required to construct traditional concrete structures, and also have significant advantages in terms of formability, construction periods, and the like. Related art includes U.S. Pat. No. 2,396,629.

In conventional 3D printers for construction, including 3D printer disclosed in U.S. Pat. No. 2,396,629, as shown in FIG. 1, a fluid printing matter 20 such as concrete or mortar is extruded in a linear form through a movable nozzle 11, and the extruded printing matter 20 with the linear form is stacked and cured to complete a structure. FIG. 1 illustrates a situation in which a wall is printed.

The printing matter 20 of such a 3D printer for construction basically has the form of a linear extrusion, and a planned structure is formed as the linear extrusion is stacked in a movement path of the nozzle 11. In the 3D printer illustrated in FIG. 1, the nozzle 11 that discharges the printing matter 20 is installed on a printer body in the form of a gantry crane to be freely movable horizontally and vertically. However, additionally, various cranes such as a jib crane as well as various means such as a multi-joint industrial robot, which are capable of freely moving the nozzle 11 and controlling the movement, may be applied.

DISCLOSURE

Technical Problem

As described above, a printing matter 20 of a three-dimensional (3D) printer for construction may be basically considered as a fluid linear extrusion, and such a fluid material, that is, the printing matter 20 such as concrete or mortar, is formed in such a way that a new fluid linear printing matter 20 discharged from a nozzle 11 is stacked based on an initial base or a previously printed print layer of a lower layer as shown in the enlarged portion of FIG. 1.

Accordingly, in a printing process of the 3D printer for construction, as the new printing matter 20 is repeatedly stacked on the initial base or the previously printed print layer of the lower layer, a top elevation of a stacked body of the entire printing matter 20 rises to form a planned structure. In this case, a printing error in which the position or shape of the printing matter 20 deviates from the plan may occur due to motion errors such as errors in position and speed of the nozzle 11 that extrudes the new printing matter 20, external factors such as a wind load or vibrations, or excess or deficiency of physical properties such as viscosity and fluidity of the printing matter 20 with a fluid phase.

FIG. 2 illustrates the printing error of the construction 3D printer described above, showing a cross-sectional view of the printing matter 20 cut along a vertical plane perpendicular to the traveling direction of the nozzle 11. In the drawing, the solid line represents the actually printed shape of the printing matter 20, while the dashed line represents the originally planned shape.

The printing error of the 3D printer for construction may be classified into a displacement error in which the overall position of the printing matter 20, including a center line, deviates from a planned position and a height error in which a top height of the printing matter 20 exceeds or falls below a planned height. The displacement error and the height error may be formed alone or may be formed in combination of different types of errors.

In FIG. 2 which illustrates the printing error of the 3D printer for construction, a displacement error is illustrated in the upper portion, and a height error is illustrated in the lower portion, wherein the upper left and right sides of the drawing respectively illustrate a displacement error in which the printing matter 20 is deflected to the left from a planned position and a displacement error in which the printing matter 20 is deflected to the right from the planned position, and the lower left and right sides of the drawing respectively illustrates a height error in which a top height of the printing matter 20 is less than a planned height and a height error in which the top height of the printing matter 20 is greater than the planned height.

The causes of the displacement error shown in the upper portion of FIG. 2 include motion errors such as errors in position and speed of the nozzle 11 of the 3D printer and external influences such as a wind load or vibrations. In particular, the printing matter 20, which is discharged in a situation in which the nozzle 11 rotates in a curved shape in a plane view, may be deflected outward from a rotational direction by centrifugal force, thereby causing the displacement error.

When such a displacement error occurs, as illustrated in the upper portion of FIG. 2, a center line of the printing matter 20 is spaced apart from a planned center line, and at the same time, the outlines of both sides of the printing matter 20 are also spaced apart from a planned outline in the same direction.

The causes of the height error illustrated in the lower portion of FIG. 2 may be the inappropriateness of the physical properties of a material discharged from the nozzle 11. When a slump value of concrete discharged from the nozzle 11 is excessive, that is, when a concrete mix is too wet, a top height of the printing matter 20 is less than a planned height, and when the slump value of the concrete is insufficient, that is, when the concrete is too dry, the top height of the printing matter 20 is greater than the planned height.

In addition, as illustrated in the lower portion of FIG. 2, in the case of a height error caused by concrete physical properties, an error also occurs at a lateral outer peripheral portion of the printing matter 20. In the case of excessive slump concrete illustrated in the lower left portion of FIG. 2, a top height of the printing matter 20 is excessively lowered, and at the same time, outer peripheral portions of both sides of the printing matter 20 collapse outward, thereby forming an outline that protrudes outward further than a planned outline, and in the case of excessively small slump concrete illustrated in the lower right portion of FIG. 2, the lateral expansion of a cross section due to dead load of the printing matter 20 is suppressed immediately after print of the printing matter 20, and thus a top height of the printing matter 20 is greater than a planned height and outer peripheral portions of both sides are also formed by shrinking toward the center.

In addition, although not illustrated in FIG. 2, a height error may occur even when a movement speed or discharge flow rate of the nozzle 11 is inappropriate. When the movement speed of the nozzle 11 is excessively fast or the discharge flow rate is insufficient, a top height of the printing matter 20 may be lowered due to an insufficient print amount per unit area or unit section, and when the movement speed of the nozzle 11 is excessively slow or the discharge flow rate is excessive, the top height of the printing matter 20 may rise due to an excessive print amount per unit area or unit section. When a height error occurs due to the movement speed or discharge flow rate of the nozzle 11, an error of an outer peripheral portion of the printing matter 20 may not be accompanied according to a situation.

As such, in conventional 3D printers for construction, various types of errors may be caused by various reasons. As described above, due to the operation characteristics of the 3D printer for construction in which the linear printing matter 20 is stacked in a plurality of layers to form a planned structure, during a sequential stacking forming process of the entire stacked body, errors in individual layers of the printing matter 20 may accumulate, which may result in serious damage to the construction precision and performance of the entire structure.

Therefore, during an operation of printing a structure using the conventional 3D printers for construction, continuous detection of displacement errors and height errors occurring in the printing matter 20 has been required, and when an error has exceeded a tolerance as a detection result, the operation of the 3D printer has had to be stopped, a control setting value of the 3D printer has had to be adjusted, and then the operation had to be resumed.

In particular, error detection and control setting value adjustment in the conventional 3D printers for construction have been performed based on manual operation by workers, a long-term operation by highly skilled technicians has been required, and the error detection and the setting value adjustment have had to be repeated through trial and error, which has inevitably caused reduced work efficiency and delay in construction period.

Technical Solution

The present disclosure has been made in consideration of the above problems and relates to a method of controlling a three-dimensional (3D) printer for construction through a configuration in which the 3D printer for construction prints a printing matter 20 from a nozzle 11 that moves, a controller 10 controls the 3D printer for construction, a scanner 30 detects surface information of a subject, and a computer 40 is connected to the controller 10 to transmit command information 19 to the controller 10 and is connected to the scanner 30 to receive the surface information transmitted from the scanner 30 and process the received surface information, the method including an actual measurement operation S10 of detecting, by the scanner 30, the actually measured surface information 39 of the printing matter 20 printed from the 3D printer for construction and transmitting the detected actually measured surface information 39 to the computer 40, a comparison operation S20 of comparing, by the computer 40, the transmitted actually measured surface information 39 of the printing matter 20 with planned surface information 49 of a planned structure to calculate a printing error, a correction operation S31 of, when the printing error exceeds a tolerance, correcting, by the computer 40, the command information 19 such that the printing error is compensated for, and a command operation S32 of transmitting, by the computer 40, the corrected command information 19 to the controller 10.

In addition, the present disclosure relates to the method of controlling the 3D printer for construction in which, in the comparison operation S20, a STL file constituting the planned surface information 49 is allowed to overlap a STL file constituting the actually measured surface information 39, and when a deviation exceeding a preset reference value occurs in information of the overlapping STL files, the deviation is considered as a printing error.

Advantageous Effects

Through the present disclosure, in forming a structure using a 3D printer for construction, an error of a printing matter 20 may be quickly identified in real time, and also a setting value of a controller 10 of the 3D printer for construction may be immediately adjusted based on the identified error.

In particular, the real-time detection of an error of the printing matter 20 and the adjustment of the controller 10 described above may be automatically performed by a computer 40 without detailed manipulation by a user to enable prompt measures to the initial occurrence of an error of the printing matter 20, thereby preventing the continuous occurrence and accumulation of the error of the printing matter 20 to improve the precision of structural construction using a 3D printer for construction.

In addition, error inspection of the printing matter 20 and the setting value adjustment of the controller 10 of the 3D printer for construction are performed without stopping of the operation of the 3D printer, thereby securing work efficiency and reducing construction period.

MODE FOR INVENTION

The detailed configuration and execution process of the present disclosure will be described below with reference to the accompanying drawings.

Figure 1:
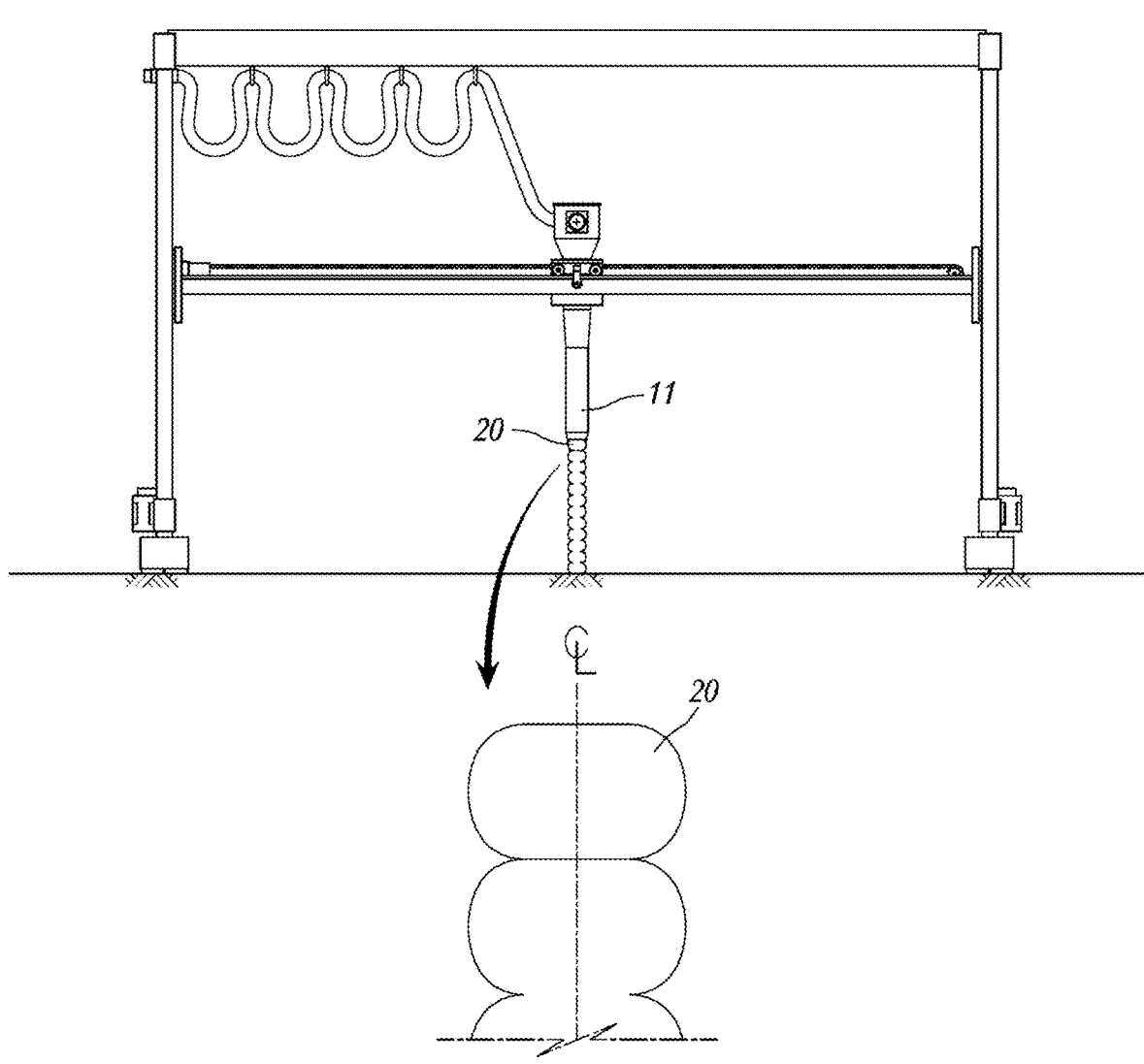
FIG. 1 is an example view of a conventional three-dimensional (3D) printer for construction.
Figure 2:
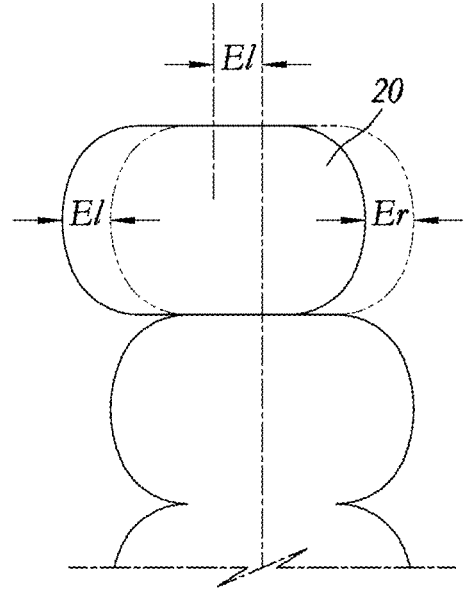
FIG. 2 shows views for describing an error of a printing matter of a 3D printer for construction.
Figure 2:
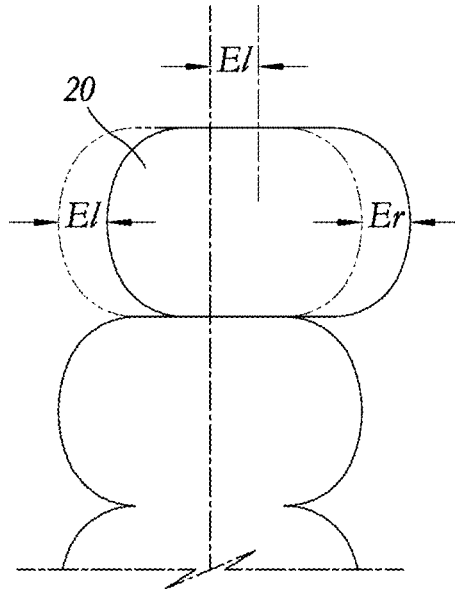
Figure 2:
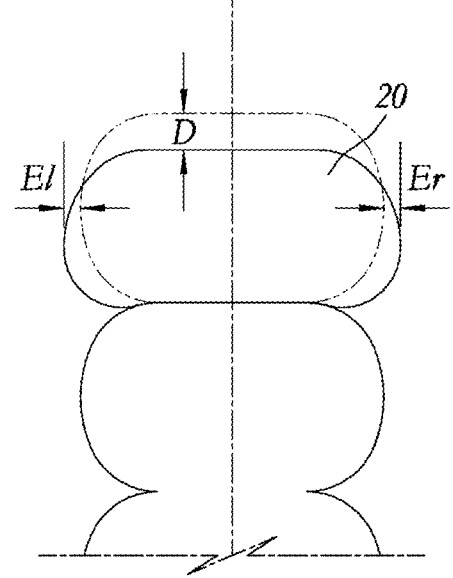
Figure 2:
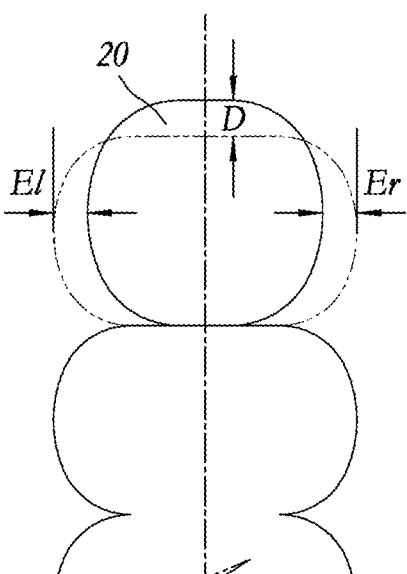
Figure 3:
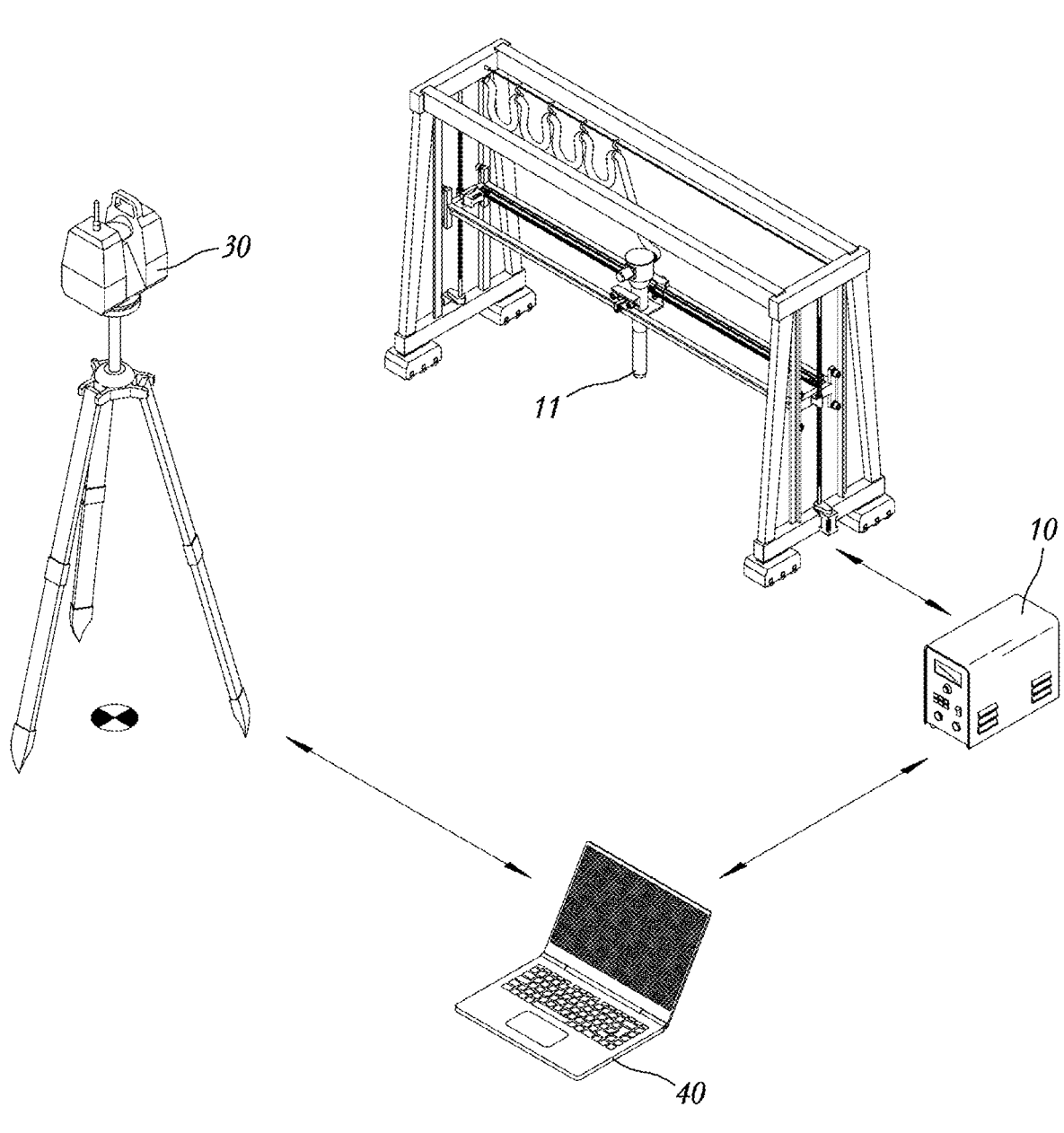
FIG. 3 is a configuration diagram of a system in which the present disclosure is implemented.

First, FIG. 3 illustrates respective components of a system in which the present disclosure is implemented and a connection relationship therebetween. The present disclosure is performed by a three-dimensional (3D) printer for construction configured to print a printing matter 20 from a nozzle 11 that moves, a controller 10 configured to control the 3D printer for construction, a scanner 30 configured to detect stereoscopic surface information of a subject, and a computer 40 connected to the controller 10 to transmit command information 19 to the controller 10 and connected to the scanner 30 to receive the stereoscopic surface information transmitted from the scanner 30 and process the received stereoscopic surface information.

In the present disclosure, the controller 10 is a device that performs a function of controlling the overall operation of the 3D printer, including the movement of the nozzle 11, is connected to a plurality of motors mounted on the 3D printer and that move the nozzle 11, and controls a movement position, a movement speed, and the like of the nozzle 11 when a command, that is, the command information 19 such as a G-code, is input from the computer 40.

In addition, in the case of a 3D printer for construction in which a discharge speed of the printing matter 20 discharged by the nozzle 11 may be adjusted, the discharge speed may also be controlled by the controller 10, and although not shown in the drawing, in the case of a 3D printer for construction in which a mixing ratio of a fluid material supplied to the nozzle 11 may be adjusted, the mixing ratio may also be controlled by the controller 10.

In the present disclosure, the scanner 30 is a device that detects surface information that specifies an appearance of a subject or an object. Although there may be differences according to models in specific detection techniques, the scanner 30 may perform a function of generating surface information which is numerical information about a surface shape of a subject or an object, and such surface information may include a stereo lithography (STL) file in which a surface of a subject or an object is approximated with a continuous triangular mesh.

Figure 4:
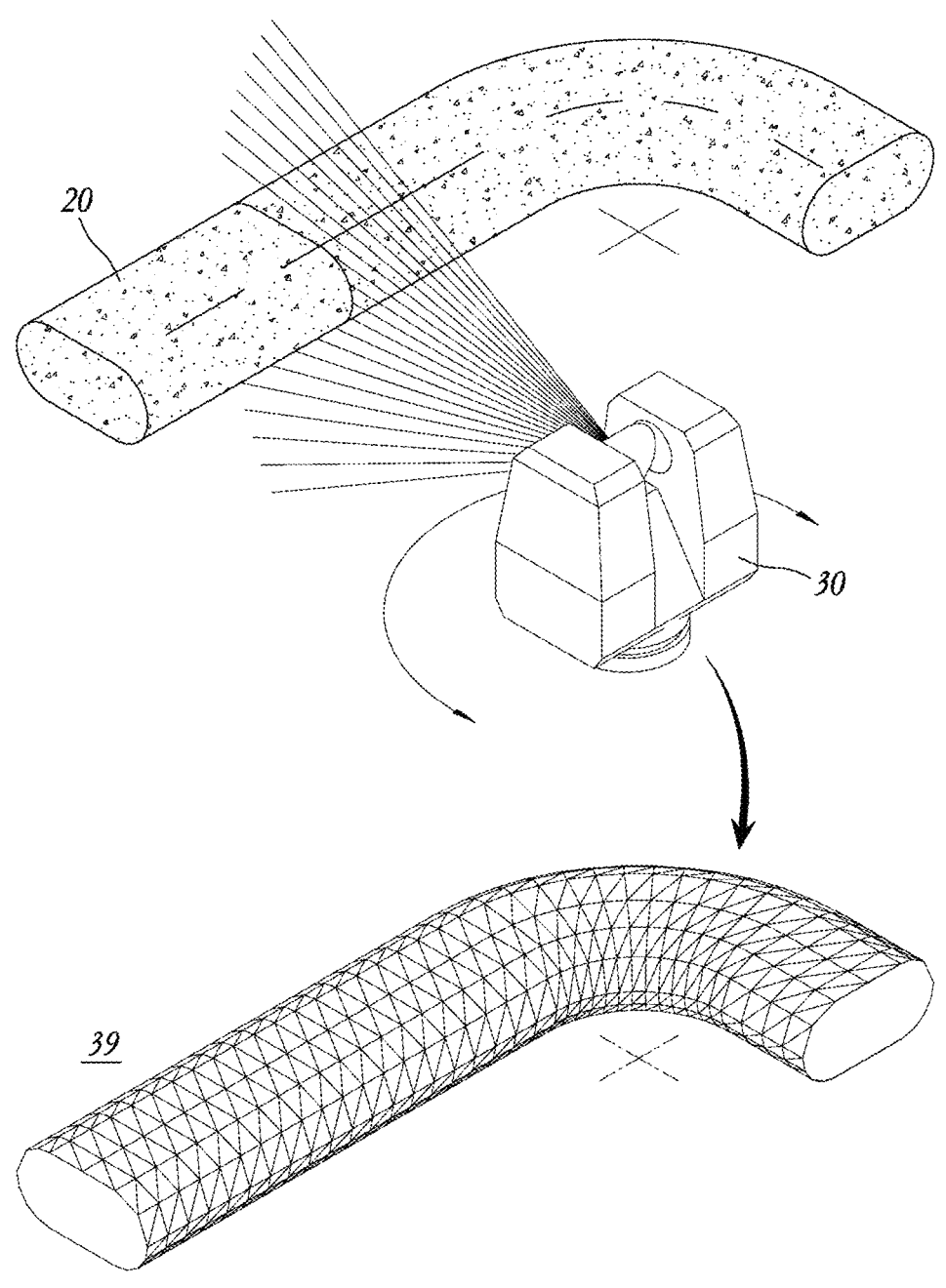
FIG. 4 is a view for describing an operation method of a scanner of the present disclosure.

That is, as shown in FIG. 4, the scanner 30 of the present disclosure is a device that measures a surface shape of the printing matter 20a which is a subject or an object and generates surface information in the form of a STL file. Specific types of the scanner 30 may include various types of a multi-distance measuring device such as a laser ranging 3D scanner or a shape information detection device such as a 3D scanner using an optical triangulation method as well as an imaging device using a photogrammetry technique or a 3D model generation device using a post-image processing technique for captured images.

In this way, various methods may be applied to operate the scanner 30 of the present disclosure. Ultimately, the main function of the scanner 30 of the present invention may be considered to generate information in the form of a STL file that may specify the surface shape of the printing matter 20 which is the subject or the object. As shown in FIG. 4, the main function of the scanner 30 may be considered to generate a STL file, that is, surface information, as numerical information of a triangular mesh structure as shown in the lower portion of FIG. 4 by scanning the printing matter 20 print by the 3D printer for construction.

A function of the surface information is not limited to a function of simply specifying an appearance, but spatial coordinates of the surface information generated by specifying a position of the scanner 30 in advance are also specified, and thus the surface information has significance as information that may be used in performing a comparison operation S20 to be described below.

That is, the scanner 30 of the present disclosure is equipped with a self-controllable computing device and a memory device to perform a function of converting measured values into the above-described surface information and record the surface information. The computer 40 and the scanner 30 are connected to each other in a wired or wireless manner so that the surface information generated by the scanner 30 is input to the computer 40.

Meanwhile, the computer 40 of the present disclosure is connected to the scanner 30 as well as the controller 10 in a wired or wireless manner and performs functions of receiving and processing the surface information and generating and transmitting the command information 19. Such functions are processed by a dedicated program installed on the computer 40.

Figure 5:
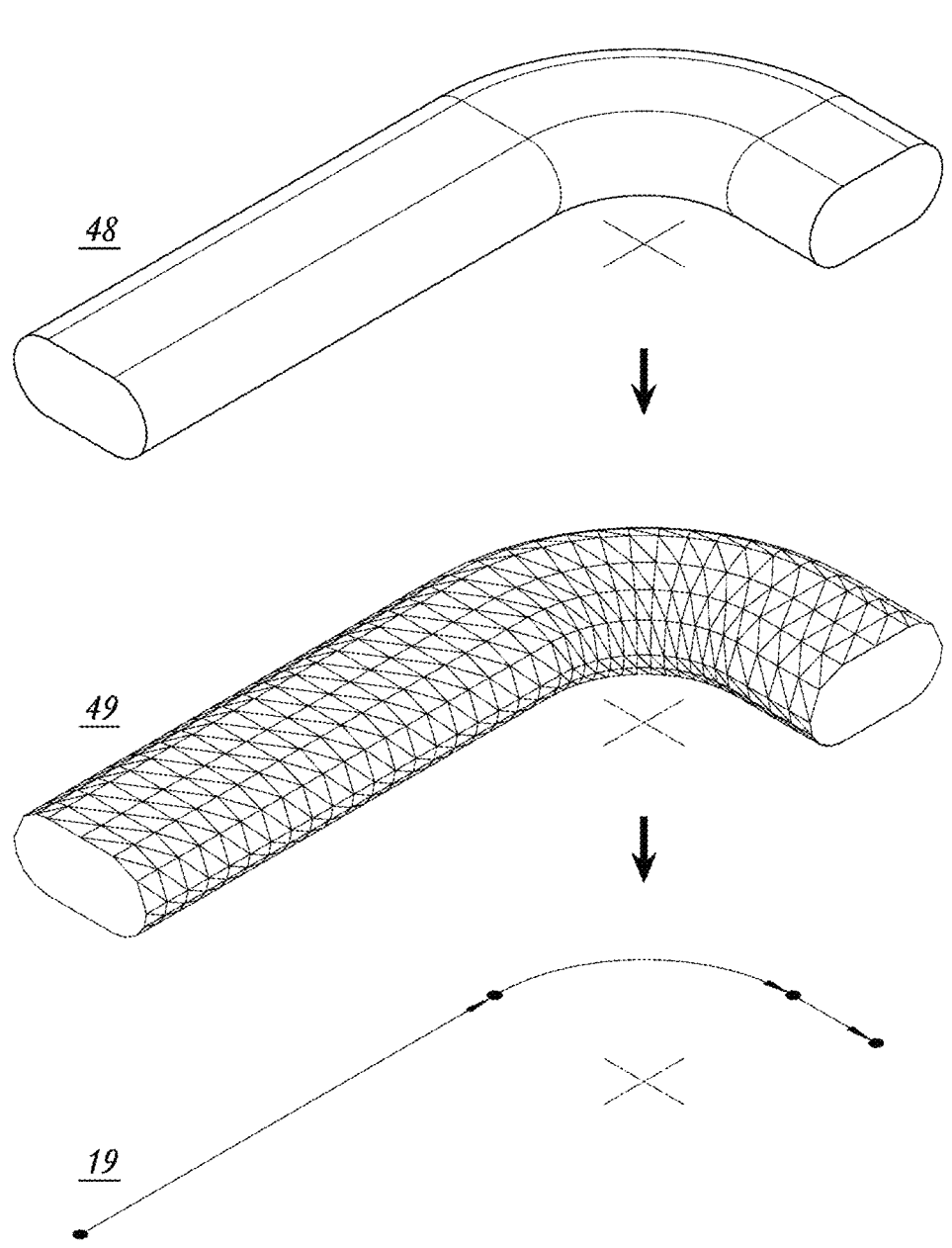
FIG. 5 is a view for describing a method of processing design model information of a computer, of the present disclosure.

FIG. 5 illustrates a process of processing design model information 48 by the computer 40 of the present disclosure. The design model information 48, which is numerical information of design information about a shape and a specification of a structure to be constructed, is processed by the computer 40 and converted into planned surface information 49 such as a STL file, and the planned surface information 49 is converted again into the command information 19 such as a G-code.

The design model information 48 being converted into the command information 19 such as the G-code by the computer 40 is a process for inputting the command information 19 to the controller 10 of the 3D printer for construction. The controller 10 controls movement or the like of the nozzle 11 of the 3D printer according to the input of the command information 19, thereby printing the printing matter 20 with the goal of a shape matching the design model information 48 as shown in the upper portion of FIG. 5.

In the embodiment illustrated in FIG. 5, when the design model information 48 is converted into the command information 19, the design model information 48 is not directly converted into the command information 19, but a process in which the design model information 48 is first converted into the planned surface information 49, and then the planned surface information 49 is converted again into the command information 19, that is, a method, in which the design model information 48 of a designed 3D model or the like is first converted to a STL file, and then the STL file is converted again to a G code, is applied. Thus, this is based on the assumption that G-code, which is adopted as the standard command information 19 in most 3D printers, including 3D printers for construction, is generated based on STL files, and that various conversion programs for creating G-code from STL files are commonly used.

Of course, the above-described dedicated program, which is installed on the computer 40 and is in charge of information processing required throughout the execution of the present disclosure, may also directly convert the design model information 48 into the command information 19 through a self-processing function, and the above-described generally used conversion program for a G code may also be used in the form of a subprogram or a program module to promote efficiency and compatibility in system construction.

Figure 6:
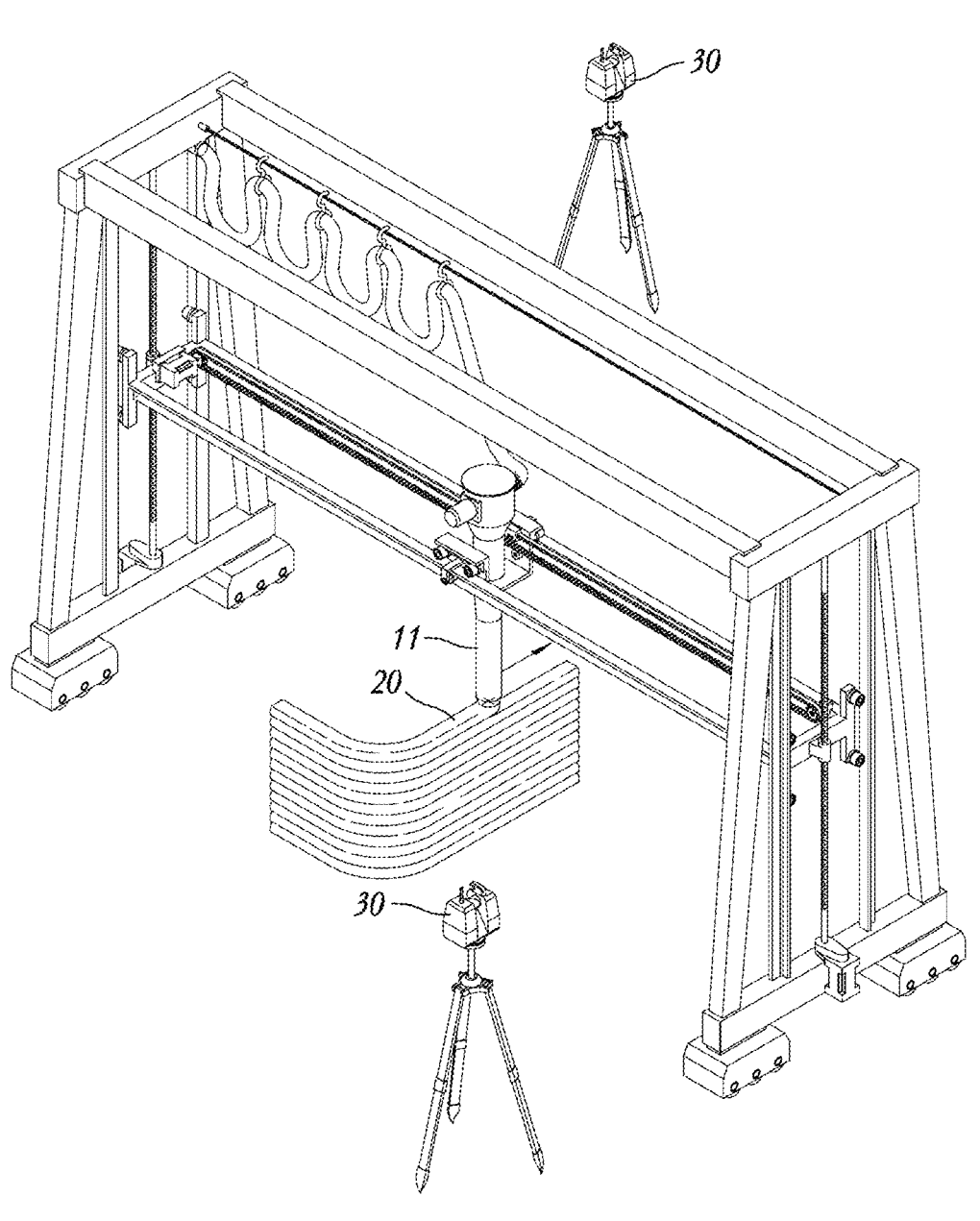
FIG. 6 is an example view of a 3D printer for construction in which the present disclosure is implemented.

FIG. 6 illustrates the 3D printer for construction in a state in which the present disclosure is implemented. As shown, the scanner 30 that obtains surface information of the printing matter 20 printed from the nozzle 11 is operated in a state in which a position thereof is fixed during a process in which the present disclosure is implemented, and as shown in FIG. 6, a plurality of scanners 30 are installed at different positions to enable actually measured of a portion of the printing matter 20 that is concealed by an existing printed structure or the 3D printer for construction itself.

Two scanners 30 are applied in the embodiment illustrated in FIG. 6, but in the case of the simple printing matter 20 in which the above-described concealed portion is not formed, the single scanner 30 may be applied, and in the case of the complex printing matter 20 or the printing matter 20 combined with an existing structure, in which concealed portions are frequently formed, two or more scanners 30 may be applied.

As described above, a function of the surface information generated in the scanner 30 to be provided to the computer 40 is not limited to a function of simply specifying an appearance, but spatial coordinates of the generated surface information are also specified by specifying a position of the scanner 30 in advance. Therefore, by simply applying the same coordinate system to overlap pieces of surface information respectively generated in the plurality of scanners 30, the pieces of surface information may be processed in the same way as the surface information generated in the single scanner 30.

As a specific method of converting a plurality of pieces of surface information generated in the plurality of scanners 30 into single surface information, a method or the like of averaging values of overlapping detected portions or weighting short-range measurement values. However, since a method of overlapping the plurality of pieces of surface information may be selected and performed by those skilled in the art, and thus a detailed limitation thereon of claims is not performed.

Figure 7:
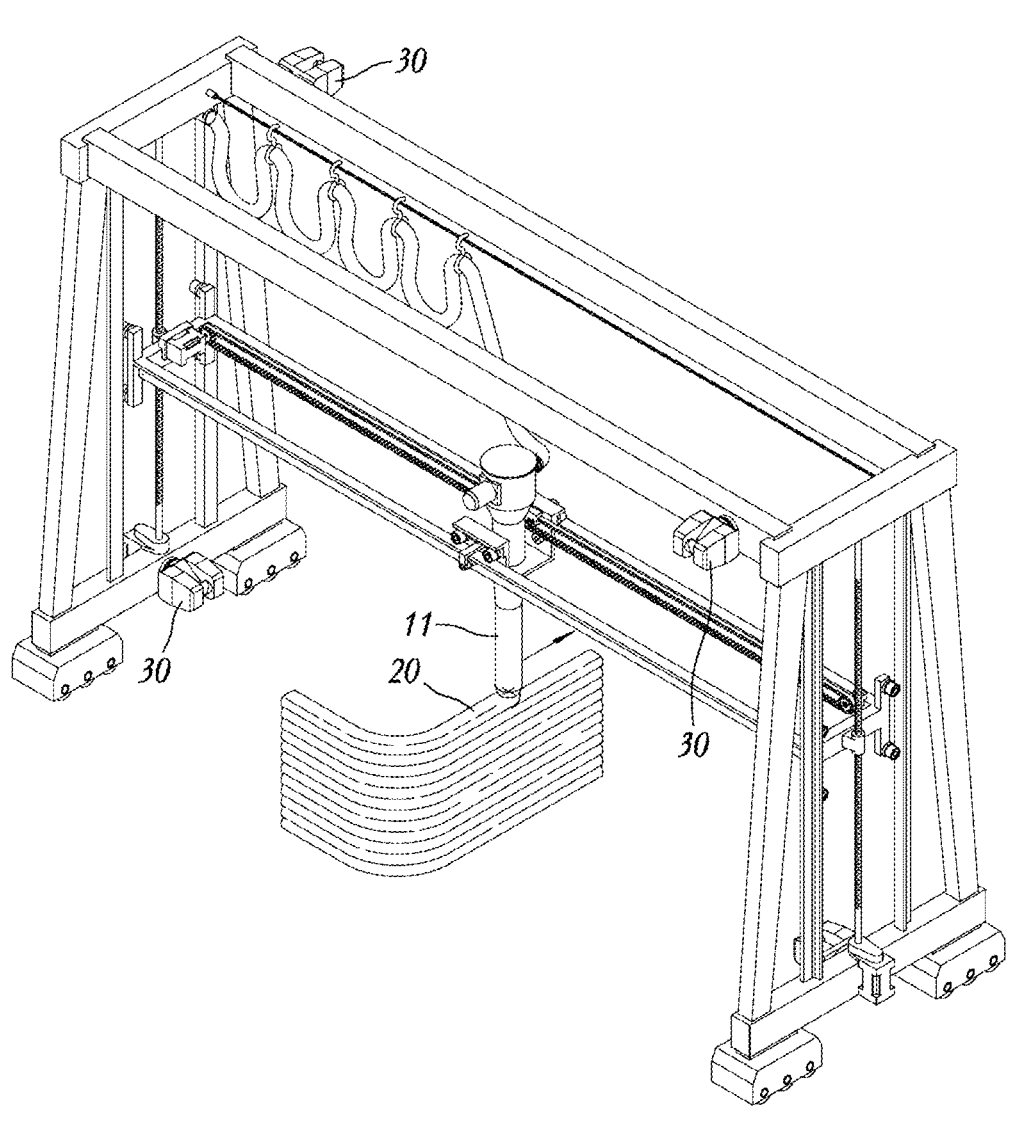
FIG. 7 is an example view of a scanner-equipped 3D printer for construction in which the present disclosure is implemented.
Figure 8:
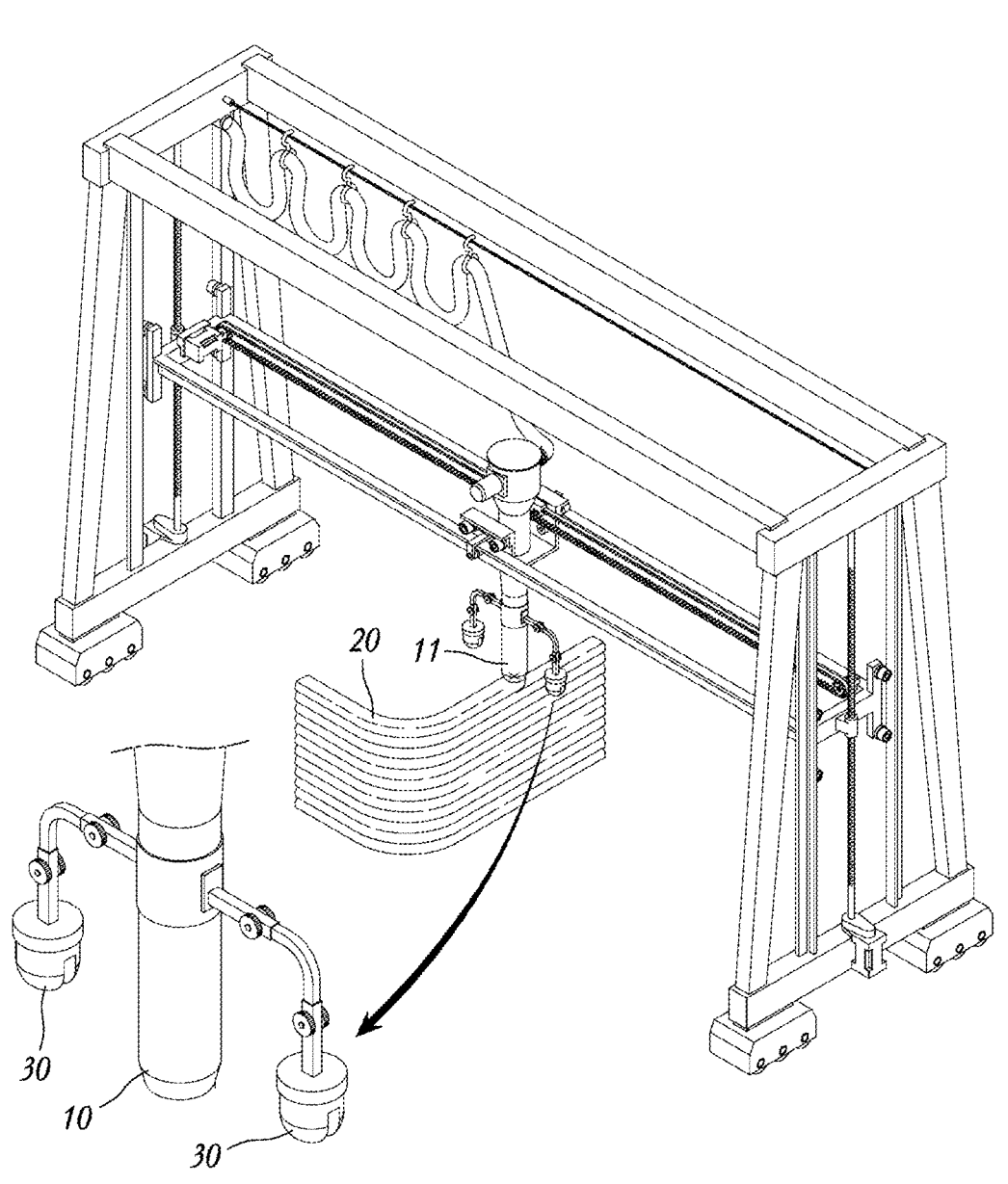
FIG. 8 is an example view of a nozzle of a scanner-equipped 3D printer for construction in which the present disclosure is implemented.

Meanwhile, FIGS. 7 and 8 illustrate an embodiment in which the scanner 30 is mounted on the 3D printer for construction, wherein FIG. 7 illustrates the plurality of scanners 30 mounted on a structural frame of the 3D printer, and FIG. 8 illustrates the plurality of scanners 30 mounted on the nozzle 11.

By mounting the scanner 30 on the 3D printer in this way, a concealed portion that may be formed by the printing matter 20 or the 3D printer itself may be minimized, and also there is an advantage in that initial setup work for specifying spatial coordinates of surface information generated in the scanner 30 may be omitted.

Of course, in the embodiment of FIGS. 7 and 8, since the mounted scanner 30 moves along with the 3D printer for construction in a process of operating the 3D printer for construction, reference points of the spatial coordinates of the surface information may move frequently. However, since the movement of the mounted scanner 30 according to the process of operating the 3D printer is performed in a state in which a path of the movement is accurately determined, the reference points may be accurately and quickly identified through a method of inversely calculating the path of the movement, and thus the same surface information as in the scanner 30, which is always operated in a fixed state as described above with reference in FIG. 6, may be detected.

Figure 9:
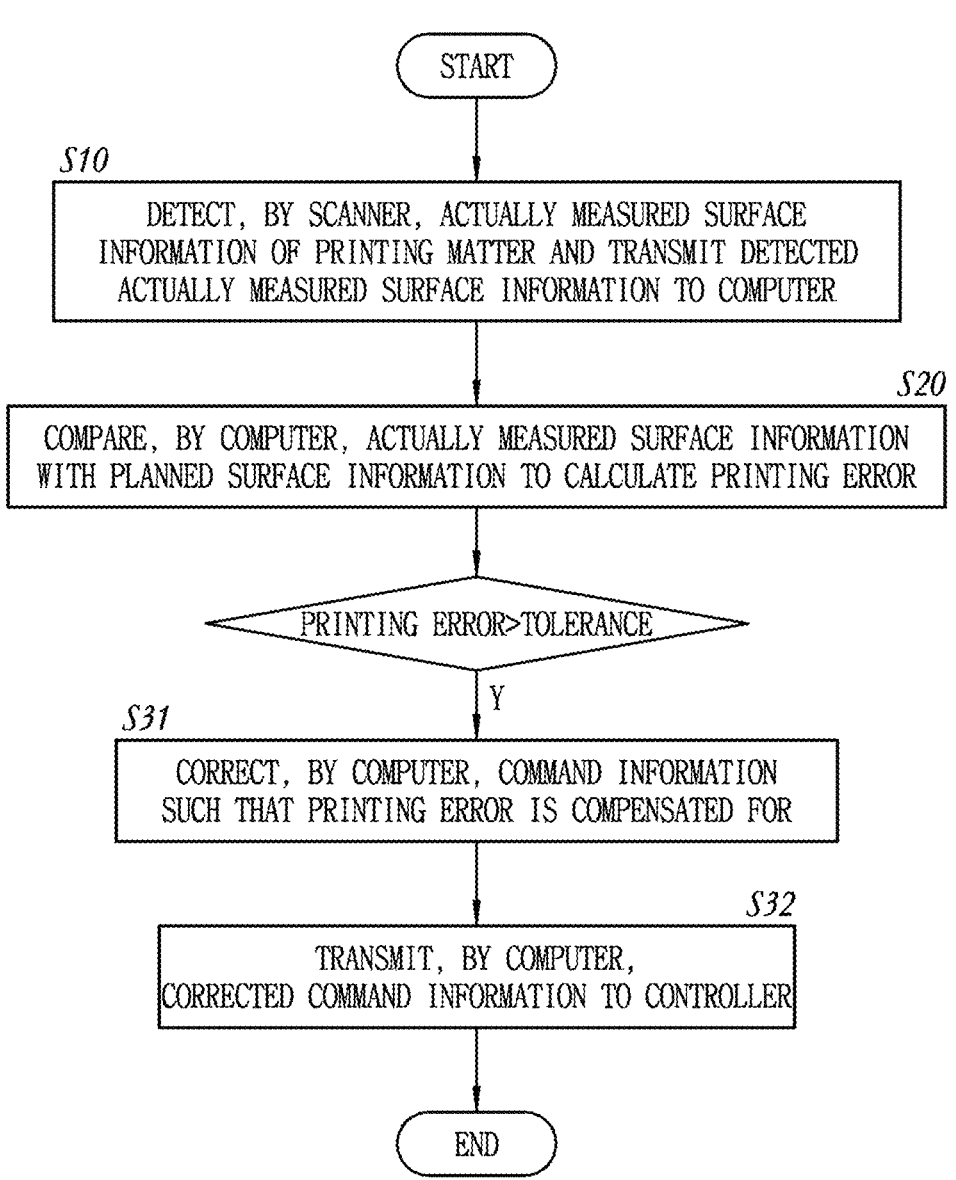
FIG. 9 is a flowchart of the present disclosure.

In the present disclosure implemented by such a configuration, as shown in FIG. 9, provided is an actual measurement operation S10 of detecting, by the scanner 30, the actually measured surface information 39 of the printing matter 20 printed from the 3D printer for construction and transmitting the detected actually measured surface information 39 to the computer 40.

The actual measurement operation S10 is a process of detecting surface information of the printing matter 20 printed from the nozzle 11 in real time as shown in FIG. 4 to generate the actually measured surface information 39. The actually measured surface information 39 is generated in the form of a STL file or the like as described above and transmitted to the computer 40 connected to the scanner 30 in a wired or wireless manner.

Thereafter, a comparison operation S20 of comparing, by the computer 40, the transmitted actually measured surface information 39 of the printing matter 20 with the planned surface information 49 of a planned structure to calculate a printing error is performed. A process of comparing the actually measured surface information 39 with the planned surface information 49 is illustrated in FIGS. 10 and 11.

Figure 10:
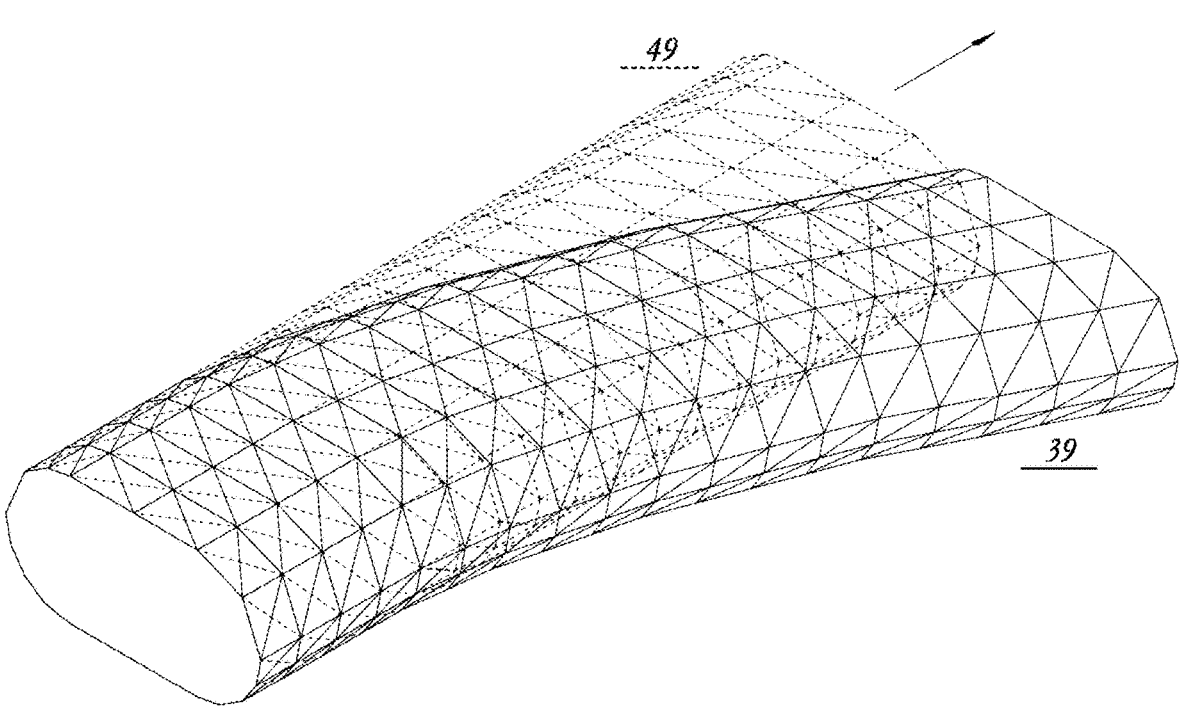
FIG. 10 is a view for describing a method of comparing actually measured surface information with planned surface information.

First, in FIG. 10, a situation is assumed in which only a mutual comparison between the actually measured surface information 39 and the planned surface information 49 is performed, and no action is taken thereafter. As shown, it can be confirmed that a displacement error occurs in which the printing matter 20 is deflected to the right based on a planar traveling direction of the nozzle 11, and as such a rightward displacement error accumulates, a serious forming defect occurs in which the printing matter 20 is excessively deflected.

Figure 11:
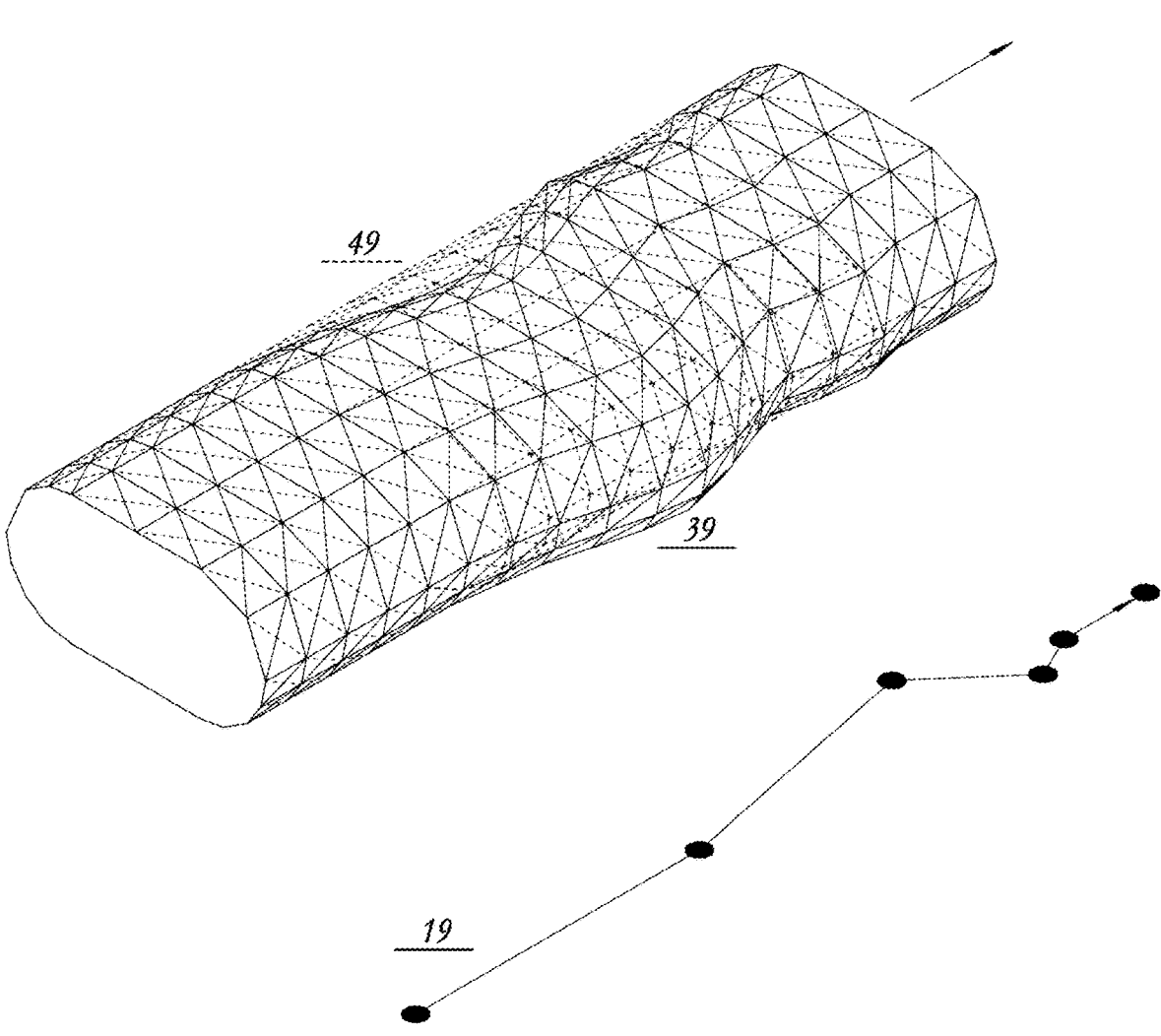
FIG. 11 is an example view of a state in which actually measured surface information is compared with planned surface information in a 3D printer for construction to which the present disclosure is applied.

FIG. 11 illustrates a situation in which, when an error occurs due to the same external factor as in FIG. 10, the printing matter 20 is corrected by applying the present disclosure. It can be confirmed that at the beginning of occurrence of a rightward displacement error, immediately after the corresponding printing error exceeds a tolerance, the command information 19 is corrected so that the displacement error is gradually corrected, and the actually measured surface information 39, which is as close as possible to the planned surface information 49, is detected.

Of course, as can be seen in FIG. 11, even in the 3D printer for construction to which the present disclosure is applied, it is impossible to completely block the occurrence of printing errors itself due to various external factors, but once a printing error exceeds a tolerance, even when the printing error that has already occurred remains, a printing error that occurs later may be considerably reduced through immediate correction of the command information 19, thereby preventing serious defects and loss of function in the printing matter 20 due to accumulated printing errors.

In the comparison operation S20, as a specific method of comparing the planned surface information 49 with the actually measured surface information 39, as illustrated in FIGS. 10 and 11, there may be a method in which a STL file constituting the planned surface information 49 is allowed to overlap a STL file constituting the actually measured surface information 39 by applying the same coordinate system and the same scale, and when a deviation exceeding a preset reference value occurs in triangular mesh information in the two overlapping STL files, the deviation is considered as a printing error.

In particular, printing error detection through triangular mesh overlapping of the two STL files enables a comparison between the overall configuration of the planned surface information 49 and the overall configuration of the actually measured surface information 39, that is, an overall comparison between a planned shape of the printing matter 20 and a shape of the printing matter 20, which is actually printed, rather than a local comparison therebetween, thereby accurately determining each detailed printing error type.

That is, through an overall comparison between shapes through the overlapping between the planned surface information 49 and the actually measured surface information 39 performed in the comparison operation S20, when the above-described displacement error occurs, it doesn't just determine only whether there is an error or calculate only a value, but for example, whether the entirety of a cross-sectional shape of the printing matter 20 is shifted to cause an error in which a center line itself is shifted or whether a specific portion of the printing matter 20 is dented due to a cause such as a poor material physical property or an extrusion speed error to cause a displacement error is accurately identified, thereby enabling appropriate measures in a subsequent operation.

Compensating for the printing error in correction operation S31 may be considered as processing that ultimately induces the reverse direction or reverse action of the printing error. For example, when a rightward displacement error occurs, a movement path of the nozzle 11 in the command information 19 is deflected to the left, and when a leftward displacement error occurs, the movement path of the nozzle 11 in the command information 19 is deflected to the right.

In addition, when a height error due to a relatively low top height occurs, a movement speed of the nozzle 11 is decreased to increase a discharge amount of the printing matter 20 per unit section, or a mixing ratio is adjusted such that a slump value decreases. When a height error due to a relatively high top height occurs, the movement speed of the nozzle 11 is increased to decrease the discharge amount of the printing matter 20 per unit section, or the mixing ratio is adjusted such that the slump value increases. As described above, in the case of a 3D printer for construction in which a mixing ratio of a fluid material supplied to the nozzle 11 may be adjusted, since the mixing ratio may also be controlled by the controller 10, the slump value may also be controlled by correcting the command information 19 for the controller 10.

The correcting of the command information 19 and the compensation of the printing error may be performed without an accurate identification of a cause of occurrence of the printing error and may be achieved by repeatedly performing the acquiring of the actually measured information 39 in real time and the correcting of the command information 19 which are unique to the present disclosure. As can be confirmed in FIG. 11, in order to compensate for a rightward displacement error, as a movement path of the nozzle 11 in the command information 19 is corrected to be deflected to the left, when excessive left-deflected movement of the nozzle 11 is caused to cause a leftward displacement error, immediately thereafter, the rightward-deflected correction of the command information 19 is performed to compensate for the leftward displacement error, and through such a repeated correction process, a displacement error is gradually reduced so that the movement path of the nozzle 11 in the command information 19 converges to a correct position.

In this way, when the command information 19 is corrected through correction operation S31, a command operation S32 of transmitting, by the computer 40, the corrected command information 19 to the controller 10 is performed so that the printing matter 20 having a shape close to the planned surface information 49 may be formed as shown in FIG. 11.

EXPLANATION OF REFERENCE NUMERALS DESIGNATING THE MAJOR ELEMENTS OF THE DRAWINGS

| 10: controller | 11: nozzle |
| 19: command information | 20: printed matter |
| 30: scanner | 39: actually measured surface information |
| 40: computer | 48: design model information |
| 49: planned surface information | S10: actual measurement operation |
| S20: comparison operation | S31: correction operation |
| S32: command operation | |

The invention claimed is:

1. A method of controlling a three-dimensional (3D) printer for construction through a configuration in which the 3D printer for construction linearly extrudes and prints a fluid printing matter, including concrete or mortar, from a nozzle that moves, a controller controls the 3D printer for construction, a scanner detects surface information of a subject comprising spatial coordinates, and a computer is connected to the controller to transmit command information to the controller and is connected to the scanner to receive the surface information transmitted from the scanner and process the received surface information, the method comprising:

an actual measurement operation S10 of detecting, by the scanner, actually measured surface information of the printing matter in real time as the printing matter is being printed from the nozzle and transmitting the detected actually measured surface information to the computer, wherein the actually measured surface information comprises the spatial coordinates;

a comparison operation S20 of comparing, by the computer, the transmitted actually measured surface information of the printing matter with planned surface information of a planned structure to calculate a printing error;

a correction operation S31 of, when the printing error exceeds a tolerance, immediately correcting, by the computer, and without stopping the operation of the 3D printer, the command information such that the printing error is compensated for by the following operations: (1) deflecting a movement path of the nozzle in the command information, (2) increasing or decreasing a movement speed of the nozzle in the command information, and (3) adjusting the mixing ratio of the fluid material supplied to the nozzle in the command information; and a command operation S32 of transmitting, by the computer, the corrected command information to the controller, wherein the actual measurement operation S10 and the correction operation S31 are repeatedly and continuously performed while the 3D printer is in operation, so that the movement path of the nozzle or the state of the printing matter converges to a planned position or state.

\* \* \* \* \*